United States Patent
Yu et al.

(10) Patent No.: US 10,411,809 B2
(45) Date of Patent: Sep. 10, 2019

(54) SYSTEM AND METHODS FOR HIGH SYMBOL-RATE OPTICAL NYQUIST SIGNAL GENERATION WITH ROLL-OFF FACTOR APPROACHING ZERO

(71) Applicant: ZTE (USA) Inc., Austin, TX (US)

(72) Inventors: Jianjun Yu, Basking Ridge, NJ (US); Junwen Zhang, Morristown, NJ (US)

(73) Assignee: ZTE (USA) Inc., Austin, TX (US)

( * ) Notice: Subject to any disclaimer, the term of this patent is extended or adjusted under 35 U.S.C. 154(b) by 0 days.

(21) Appl. No.: 15/334,417

(22) Filed: Oct. 26, 2016

(65) Prior Publication Data

US 2017/0237501 A1 Aug. 17, 2017

Related U.S. Application Data

(60) Provisional application No. 62/250,757, filed on Nov. 4, 2015, provisional application No. 62/249,617, filed on Nov. 2, 2015.

(51) Int. Cl.
| | | |
|---|---|---|
| H04B 10/54 | (2013.01) | |
| H04J 14/02 | (2006.01) | |
| H04B 10/548 | (2013.01) | |

(52) U.S. Cl.
CPC ......... *H04B 10/541* (2013.01); *H04B 10/548* (2013.01); *H04J 14/02* (2013.01)

(58) Field of Classification Search
CPC ...... H04B 10/541; H04B 10/548; H04J 14/02
See application file for complete search history.

(56) References Cited

U.S. PATENT DOCUMENTS

| | | | | |
|---|---|---|---|---|
| 2004/0052535 A1* | 3/2004 | Nohara | ... | H04B 10/11 398/189 |
| 2015/0323781 A1* | 11/2015 | Schneider | ... | G02B 26/06 359/238 |

OTHER PUBLICATIONS

Hillerkuss, D., et al., "26 Tbit $s^{-1}$ line-rate super-channel transmission utilizing all-optical fast Fourier transform processing", Nature Photonics, vol. 5, (2011), pp. 364-371.
Hu, H., et al., "320 Gb/s Nyquist OTDM received by polarization-insensitive time-domain OFT", Optics Express, vol. 22, No. 1, (2014), pp. 110-180.

(Continued)

*Primary Examiner* — Leslie C Pascal
(74) *Attorney, Agent, or Firm* — Perkins Coie LLP

(57) ABSTRACT

Disclosed systems, methods, and computer program products enable high symbol-rate optical Nyquist signal generation with roll-off factors approaching zero by combining digital and all-optical methods. The combined digital and all-optical methods utilize all-optical sine-shaped pulse generation and orthogonal time-division multiplexing with quadrature amplitude modulation using digital Nyquist signals. Disclosed embodiments exhibit inter-channel-interference penalties that are less than 0.5-dB for both 75-GBaud and 125-GBaud optical Nyquist signals, in contrast to conventional signals generated using rectangular waveform driving signals that exhibit penalties greater than 2.5-dB and 1.5-dB for 75-GBaud and 125-GBaud signals, respectively. The disclosed embodiments, therefore, enable significant improvement over conventional systems by reducing inter-channel-interference penalties caused by excess modulation induced bandwidth.

16 Claims, 15 Drawing Sheets

(56) References Cited

OTHER PUBLICATIONS

Nakazawa, M., et al., "Ultrahigh-speed 'orthogonal' TDM transmission with an optical Nyquist pulse train", Optics Expess, vol. 20, No. 2, (2012), pp. 1129-1140.

Rios-Müller, R., et al., "1-Terabit/s Net Data-Rate Transceiver Based on Single-Carrier Nyquist-Shaped 124 GBaud PDM-32QAM", Optic Fiber Communication Conference 2015, (Los Angeles, California), United States, Mar. 22-26, 2015; Optical Society of America, 2015.

Soto, M., et al., "Optical sinc-shaped Nyquist pulses of exceptional quality", Nature Communications, vol. 4, Article No. 2898, (2013), pp. 1-11.

Zhang, J., et al., "High Speed All Optical Nyquist Signal Generation and Full-band Coherent Detection", Scientific Reports, vol. 4, Article No. 6156, (2014), pp. 1-8.

Zhang, J., et al., "Transmission and full-band coherent detection of polarization-multiplexed all-optical Nyquist signals generated by Sinc-shaped Nyquist pulses", Scientific Reports, vol. 5, Article No. 13649, (2015), pp. 1-13.

\* cited by examiner

SYSTEM AND METHODS FOR HIGH SYMBOL-RATE OPTICAL NYQUIST SIGNAL GENERATION WITH ROLL-OFF FACTOR APPROACHING ZERO

CROSS-REFERENCE TO RELATED APPLICATIONS

This application claims priority to U.S. Application Nos. 62/249,617, filed Nov. 2, 2015, and 62/250,757, filed Nov. 4, 2015, both of which are incorporated herein by reference in their entirety.

TECHNICAL FIELD

The present disclosure is related generally to signal processing and transmittion of digital data over multiple carrier frequencies.

BACKGROUND

To meet the demand for continuously increasing transmission capacity, high spectral-efficiency (SE) and high data-rate systems have been developed. Orthogonal frequency division multiplexing (OFDM) technologies or Nyquist pulse multiplexing, for example, provide solutions to encode digital data in reduced bandwidth with and increased SE. Compared with OFDM, however, Nyquist signal transmission has several unique advantages such as lower receiver bandwidth and lower peak-to-average power ratio. However, according to conventional systems and methods, high symbol-rate Nyquist signal generation is difficult, especially for signals with quasi-zero roll-off factors.

SUMMARY

Disclosed systems, methods, and computer program products enable high symbol-rate optical Nyquist signal generation with roll-off factors approaching zero by combining digital and all-optical methods. The combined digital and all-optical methods utilize all-optical sine-shaped pulse generation and orthogonal time-division multiplexing (OTDM) with quadrature amplitude modulation (QAM) using digital Nyquist signals. Disclosed embodiments exhibit inter-channel-interference penalties that are less than 0.5-dB for both 75-GBaud and 125-GBaud optical Nyquist signals, in contrast to conventional signals generated using rectangular waveform driving signals that exhibit penalties greater than 2.5-dB and 1.5-dB for 75-GBaud and 125-GBaud signals, respectively. The disclosed embodiments, therefore, enable significant improvement over conventional systems by reducing inter-channel-interference penalties caused by excess modulation induced bandwidth.

According to an embodiment, a method enables data transmission using optical signals that exhibits high data-rate and high SE transmission. The method includes generating an optical sine-shaped pulse for each of a plurality of frequency tones and modulating the sinc-shaped pulses using digital Nyquist modulation signals to encode data into corresponding modulated sine-shaped pulses. The method further includes transmitting the data using optical multiplexing based on the modulated sine-shaped pulses.

According to a further embodiment, a system enables data transmission using optical signals that exhibits high data-rate and high spectral efficiency transmission. The system includes an optical pulse generator, a modulator, and a transmitter. The optical pulse generator generates an optical sine-shaped pulse for each of a plurality of frequency tones. The modulator modulates the sine-shaped pulses using digital Nyquist modulation signals to encode data into the modulated sine-shaped pulses and the transmitter transmits the data using optical multiplexing based on the modulated sine-shaped pulses.

According to a further embodiment, a non-transitory computer storage device contains computer program instructions stored thereon that, when executed by a processor, causes the processor to control a system to perform the above-discussed method that enables data transmission using optical signals that exhibits high data-rate and high spectral efficiency transmission.

DRAWINGS

While the appended claims set forth the features of the present techniques with particularity, these techniques, together with their objects and advantages, may be best understood from the following detailed description taken in conjunction with the accompanying drawings of which:

Figure 3A:
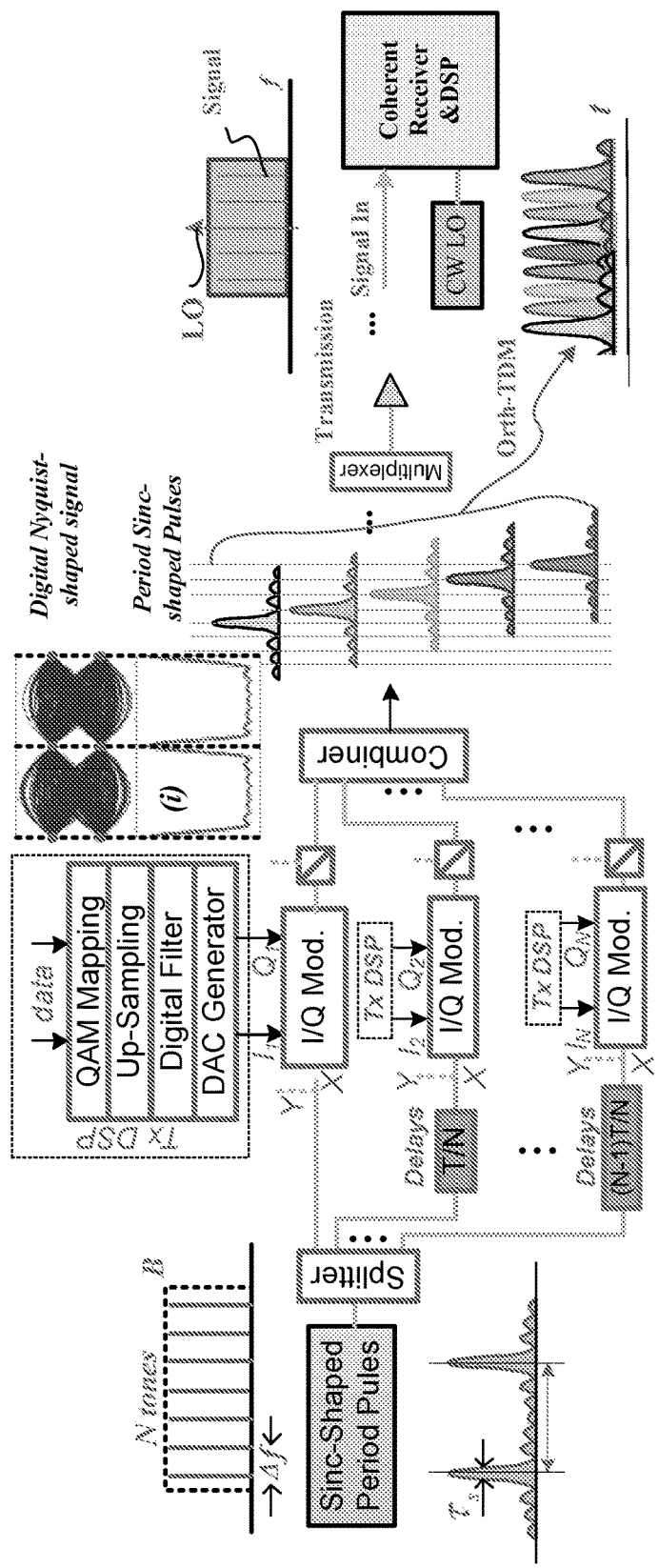
FIG. 3A is a schematic illustration of a high symbol rate Nyquist signal generation system with roll-off factor approaching zero, according to an embodiment.
Figure 3B:
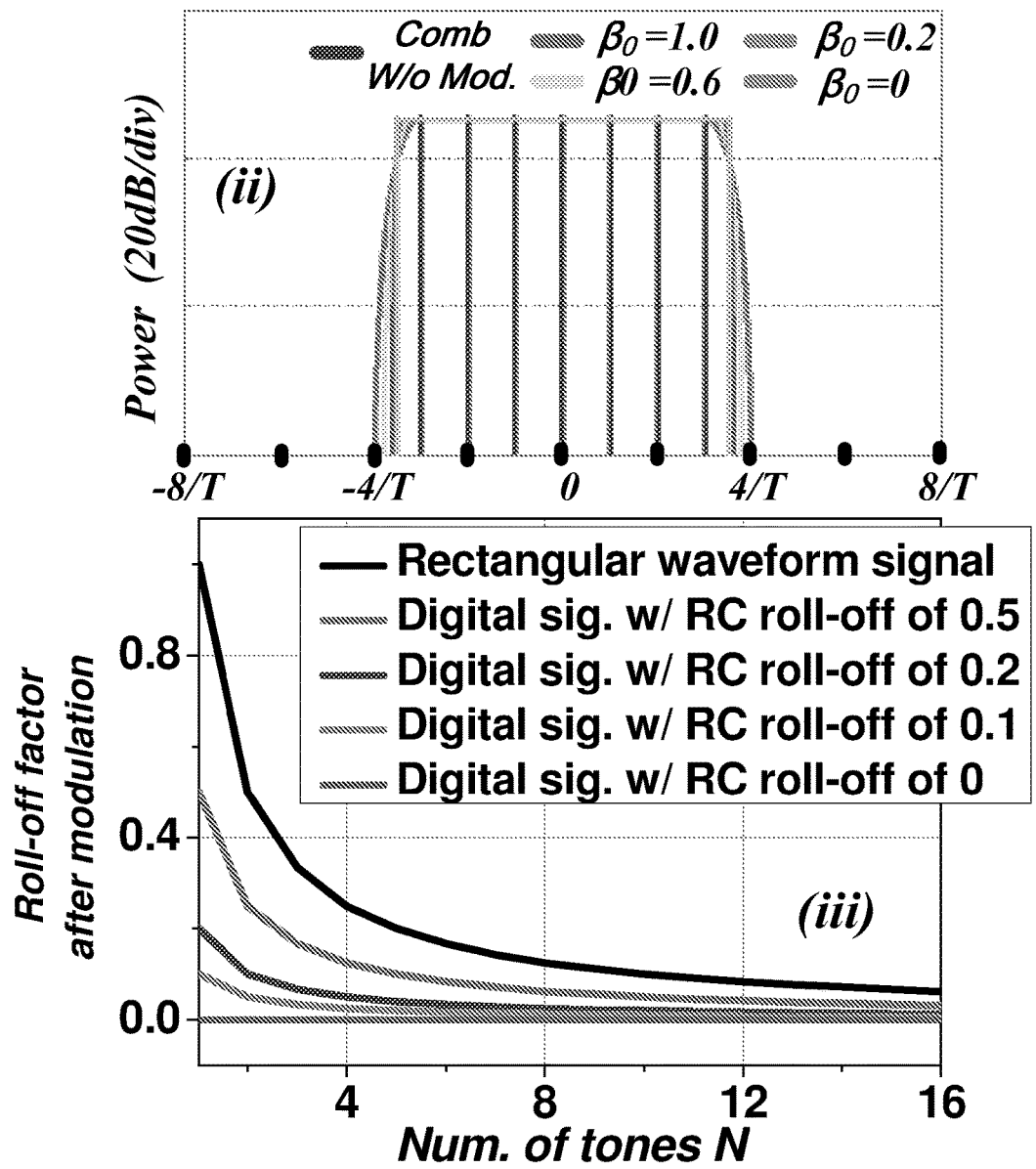
Figure 4A:
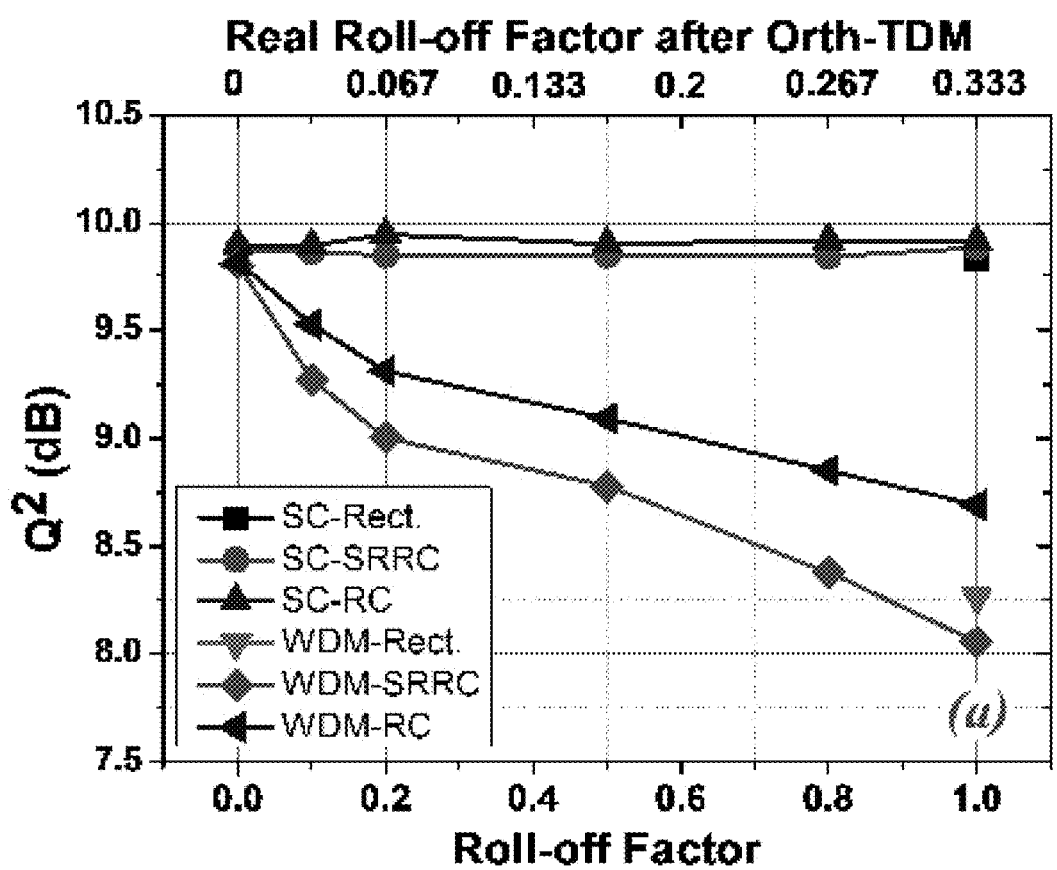
Figure 4B:
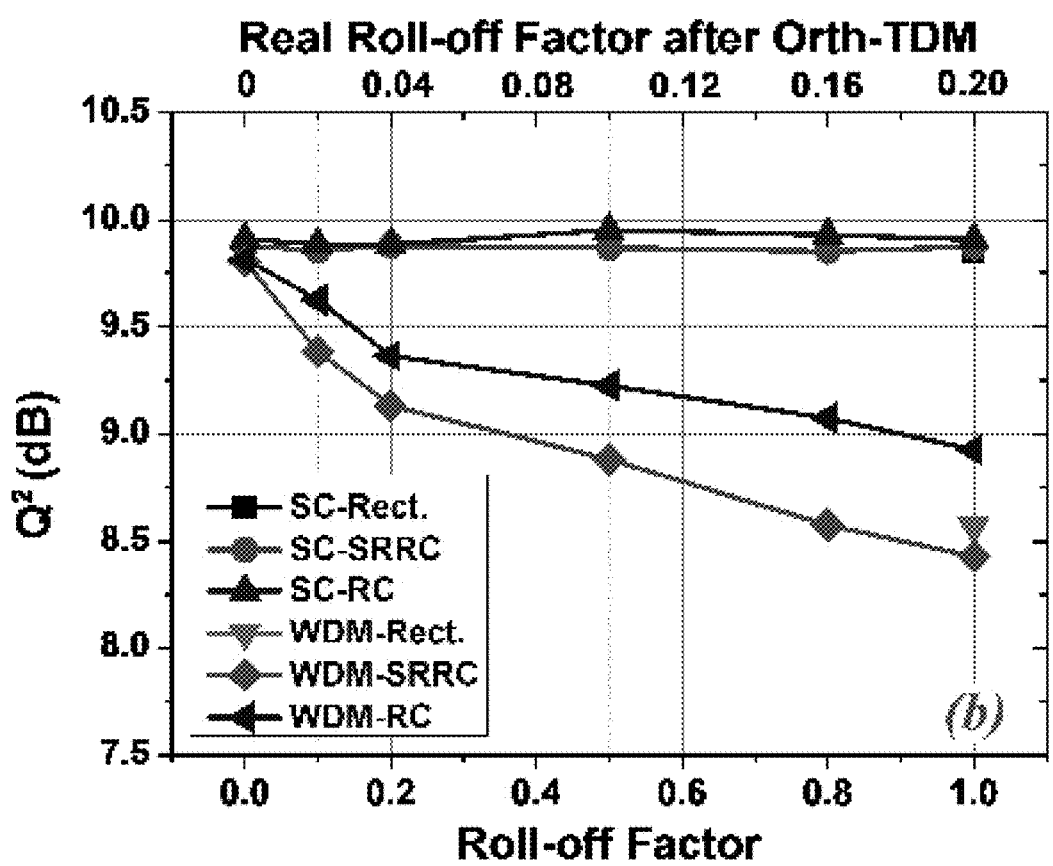
Figure 4C:
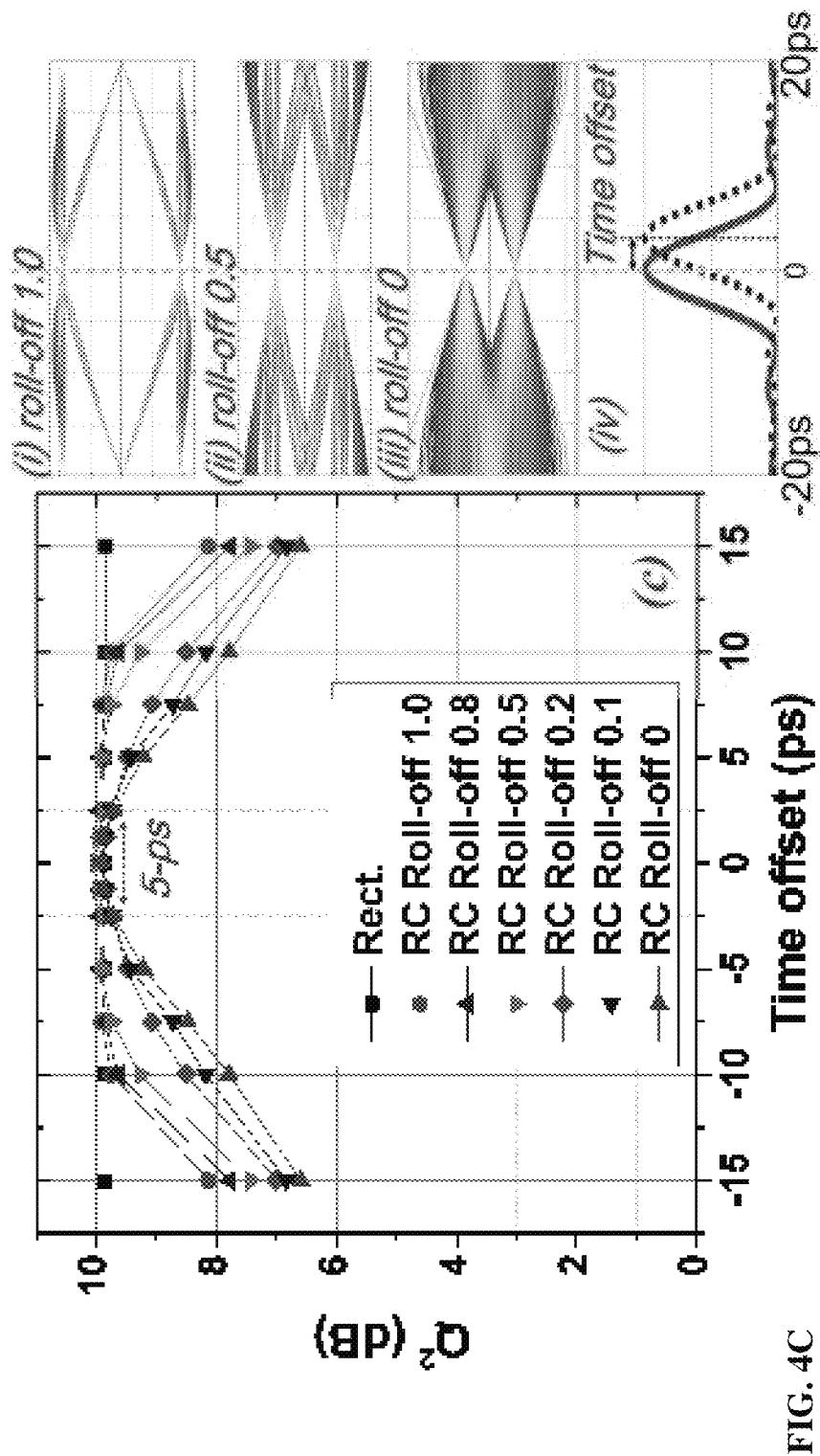
Figure 5A:
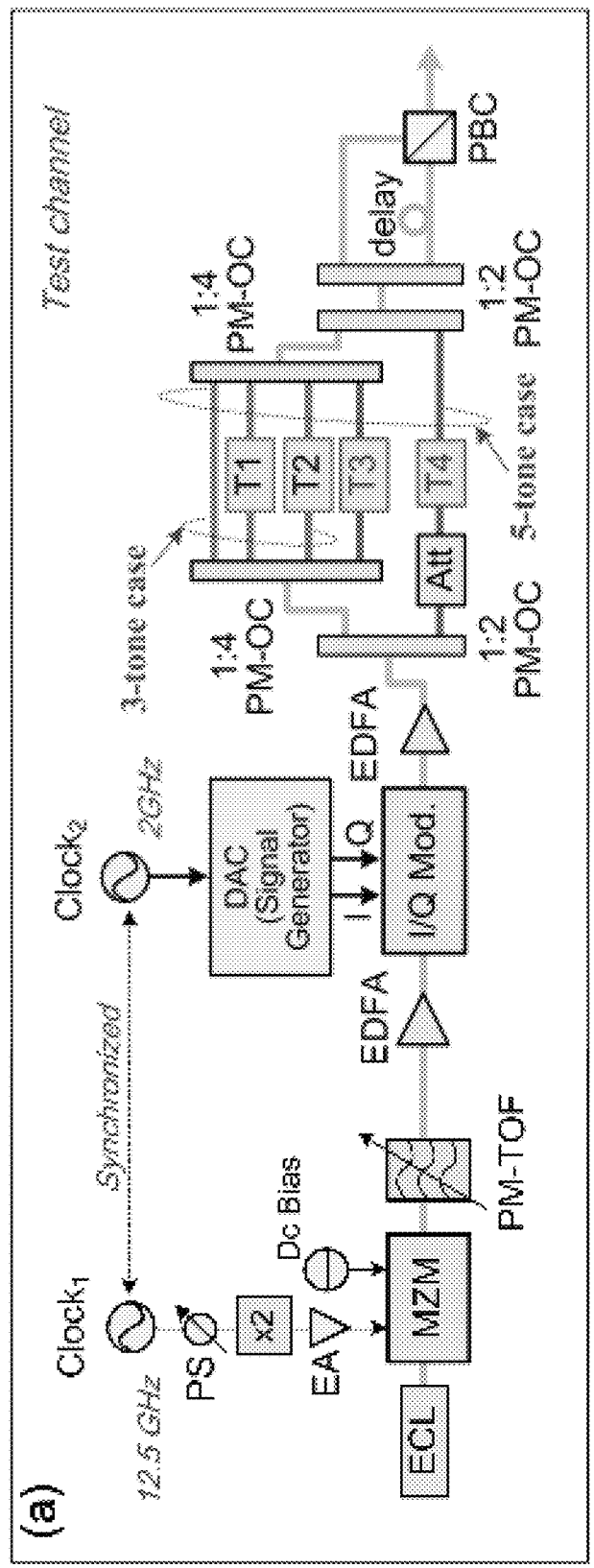
Figure 5B:
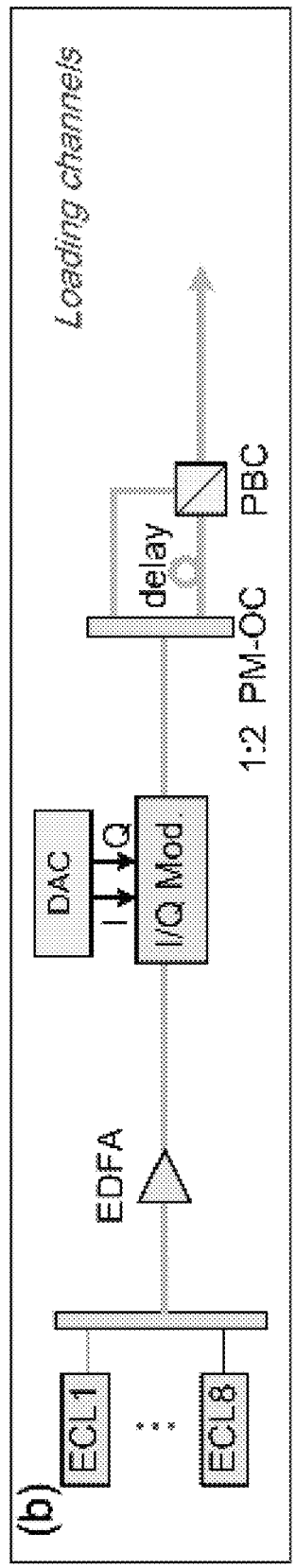
Figure 5C:
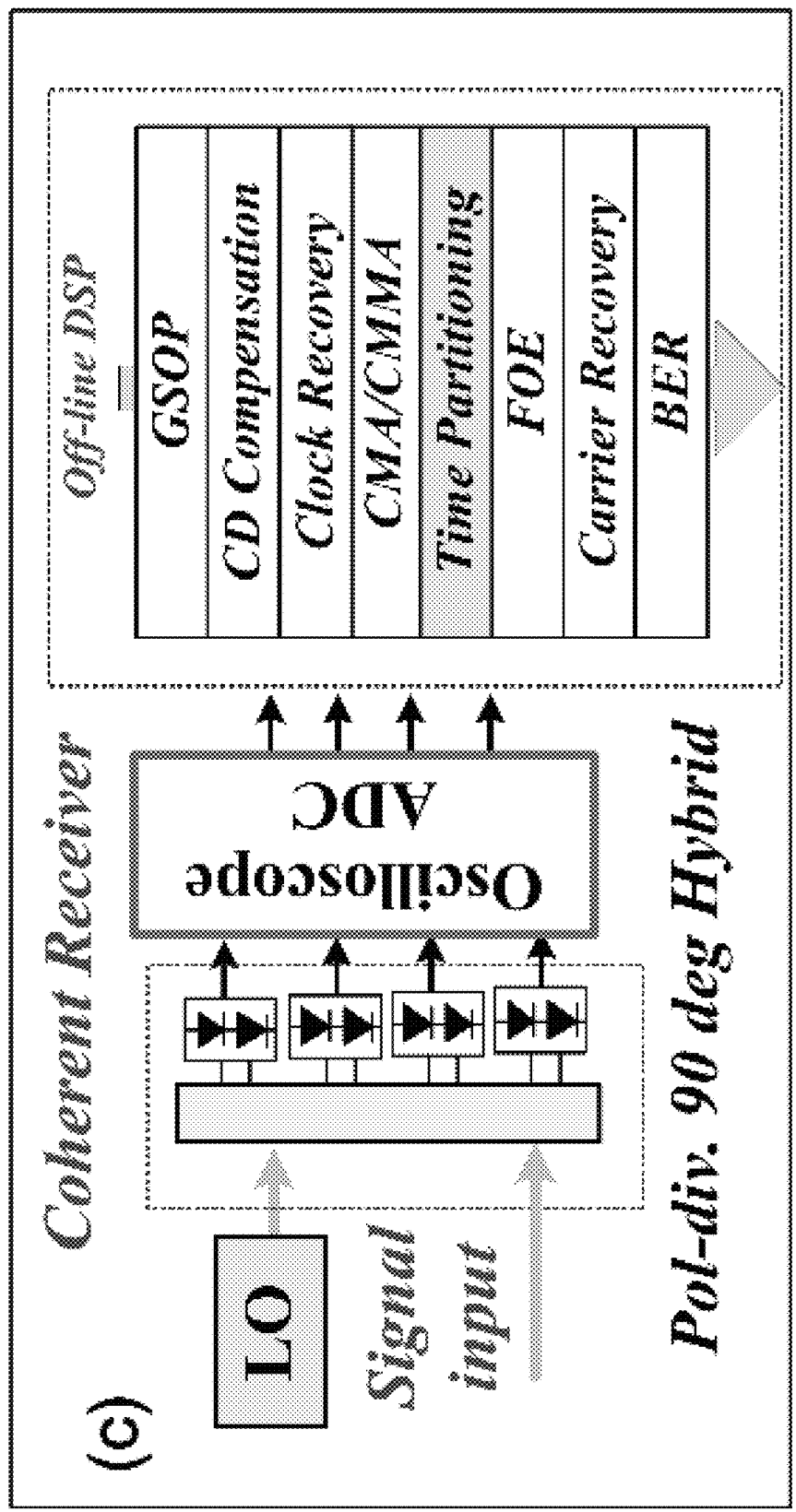
Figure 5D:
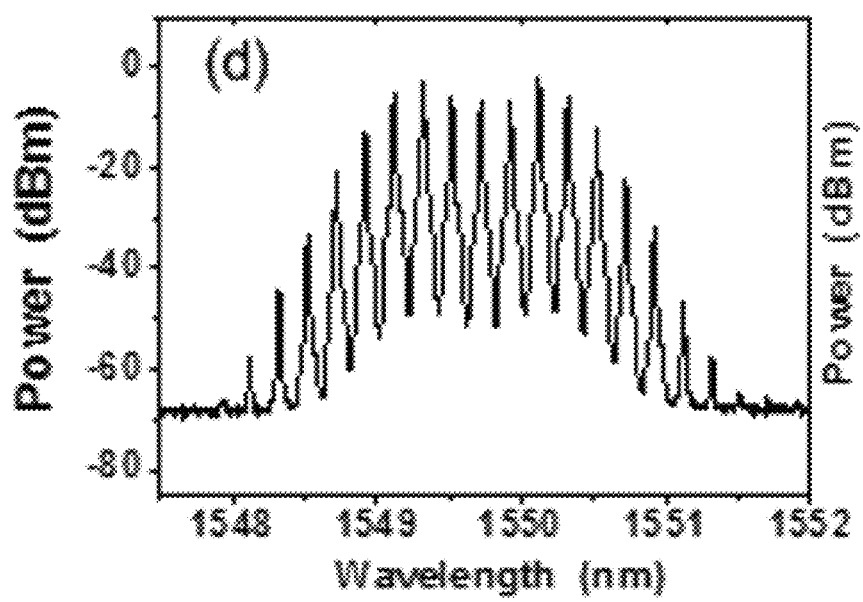
Figure 5E:
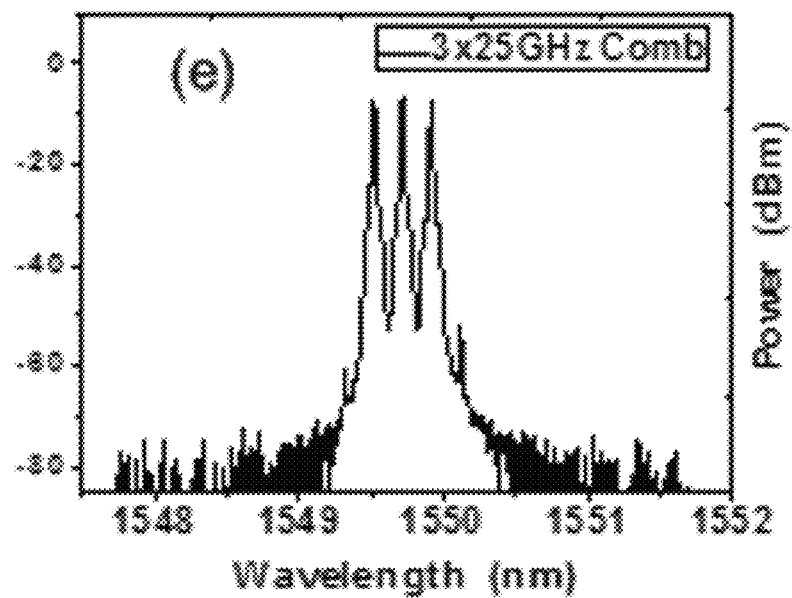
Figure 5F:
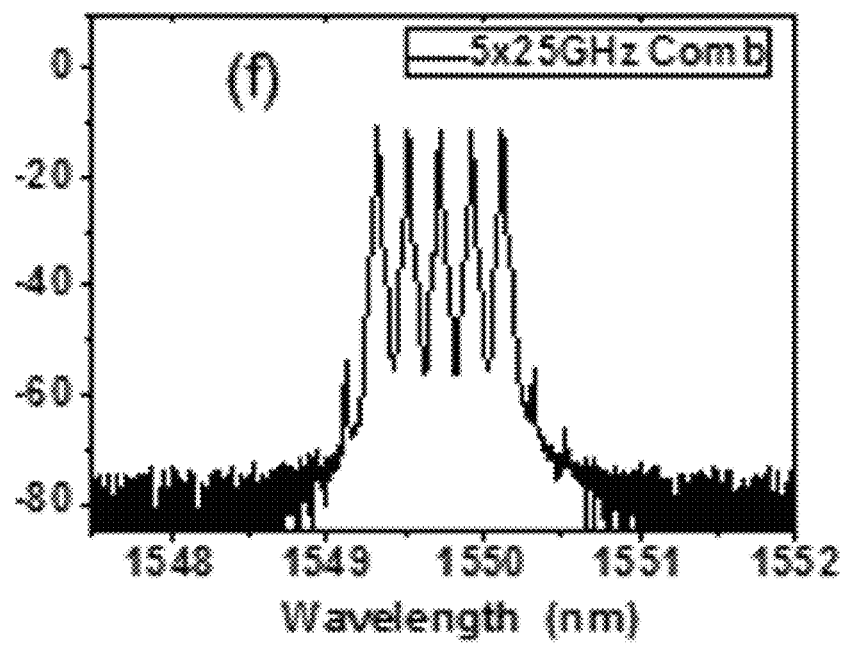
Figure 5G:
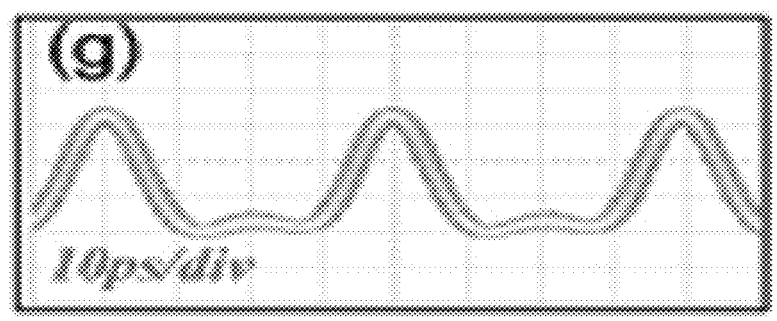
Figure 5H:
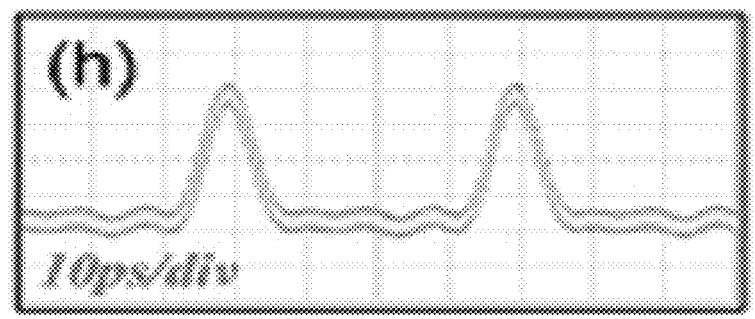
Figure 6A:
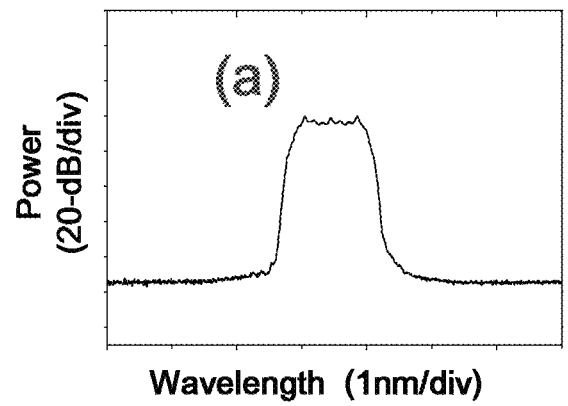
Figure 6B:
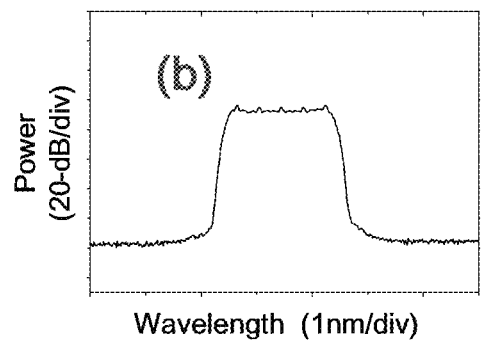
Figure 6C:
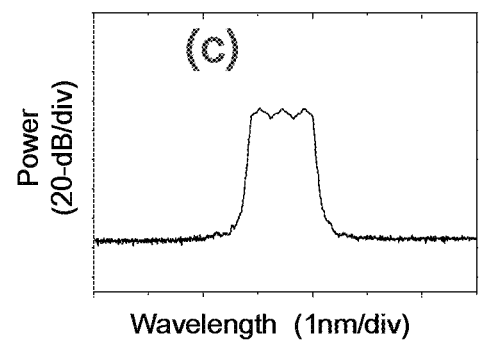
Figure 6D:
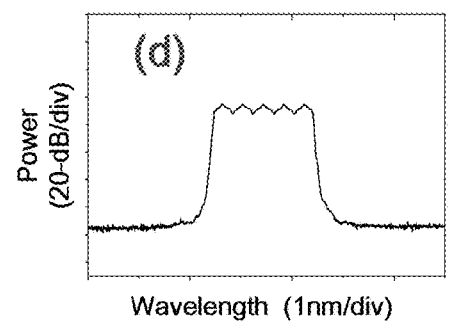
Figure 6E:
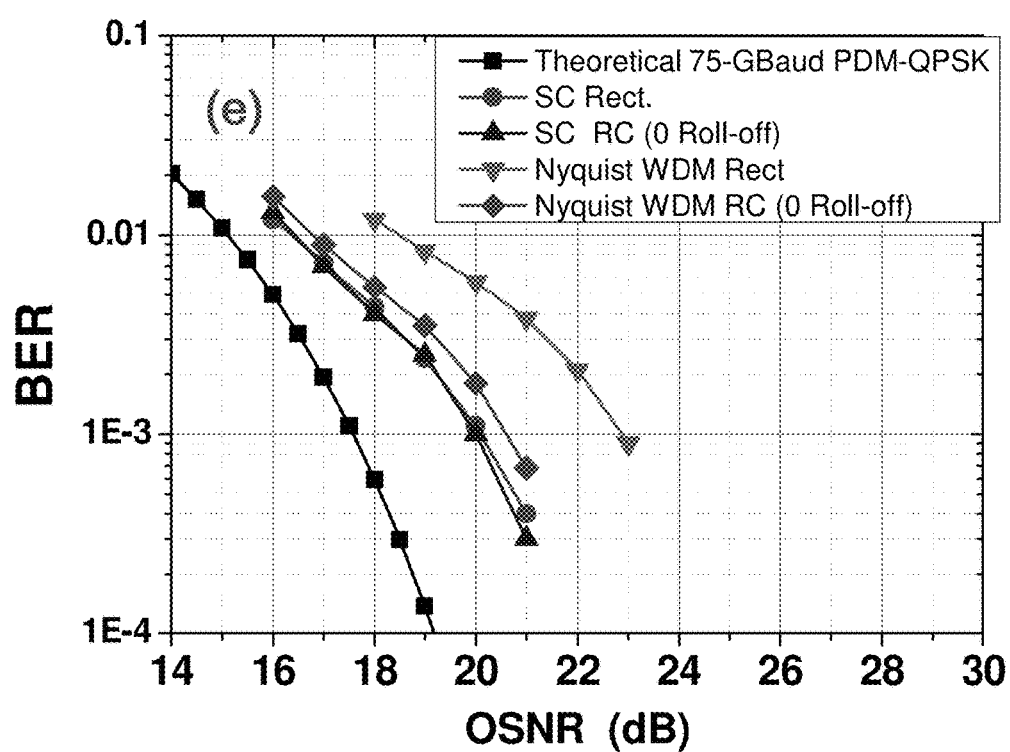
Figure 6F:
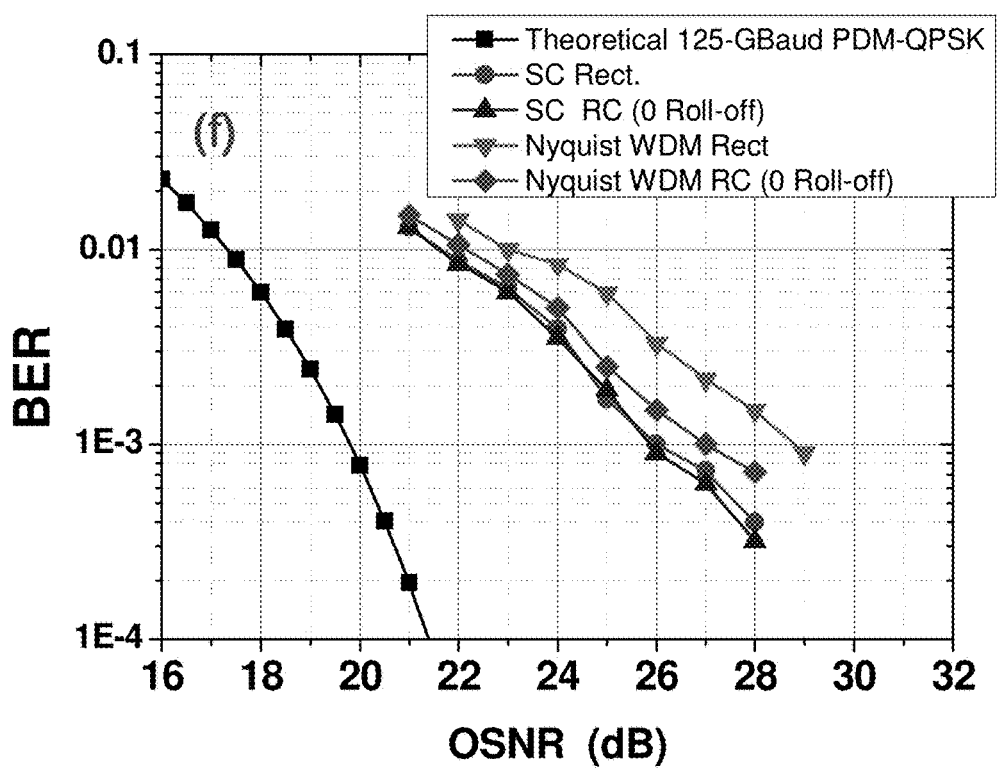

FIG. 3B presents the frequency spectrum and theoretical roll-off factor after modulation of sine-shaped pulses, according to an embodiment;

FIG. 4A presents simulation results characterizing the performance of 75-GBaud optical Nyquist signal generation in a Nyquist-WDM system, according to an embodiment;

FIG. 4B presents simulation results characterizing the performance of 125-GBaud optical Nyquist signal generation in a Nyquist-WDM system, according to an embodiment;

FIG. 4C presents simulation results of a study of the effect of between the pulse peak and eye-opening points on signal performances, according to an embodiment;

FIG. 5A is a schematic illustration of a system that enables high symbol rate PDM optical Nyquist signal generation and Nyquist-WDM transmission, according to an embodiment;

FIG. 5B is schematic illustration of a system for loading 75-GBaud and 125-GBaud signals, according to an embodiment;

FIG. 5C is a schematic illustration of a coherent receiver, according to an embodiment;

FIG. 5D presents the spectrum of generated 25-GHz spaced comb before PM-TOF, according to an embodiment;

FIG. 5E presents a 3-tone frequency comb with 25-GHz spacing, according to an embodiment;

FIG. 5F presents a 5-tone frequency comb with 25-GHz spacing, according to an embodiment;

FIG. 5G presents the time-domain waveform of the 3-tone frequency comb of FIG. 5E, according to an embodiment;

FIG. 5H presents the time-domain waveform of the 5-tone frequency comb of FIG. 5F, according to an embodiment;

FIG. 6A presents the spectrum of 75-GBaud optical Nyquist signals generated with rectangular driving signals, according to an embodiment;

FIG. 6B presents the spectrum of 125-GBaud optical Nyquist signals generated with rectangular driving signals, according to an embodiment;

FIG. 6C presents the spectra of 75-GBaud optical Nyquist signals generated with digital Nyquist-shaped driving signals with zero-roll-off factor, according to an embodiment;

FIG. 6D presents the spectra of 125-GBaud optical Nyquist signals generated with digital Nyquist-shaped driving signals with zero-roll-off factor, according to an embodiment;

FIG. 6E presents the back-to-back BER performance of the 75-GBaud optical Nyquist PDM-QPSK signal generated using different driving waveforms in both SC and Nyquist-WDM cases; and FIG. 6F presents the back-to-back BER performance of the 125-GBaud optical Nyquist PDM-QPSK signal generated using different driving waveforms in both SC and Nyquist-WDM cases.

DESCRIPTION

Unless otherwise noted, the following abbreviations are used in this disclosure:

FOE: Frequency-Offset Equalization
Q2: Q value square.
BER: Bit Error Rate
WDM: Wavelength Division Multiplexing
PM-TOF: Polarization Maintaining Tunable Optical Filter
PDM: Polarization Division Multiplexing;
RC: Raised-Cosine
Tx: Transmit
MZM: Mach-Zehder Modulator
RF: Radio Frequency
DAC: Digital Analog Converter
I/Q: the real (I) and imaginary (Q)
QPSK: Quadrature Phase Shift Keying
ECL: External Cavity Laser
LO: Local Oscillator
ADC: Analog to Digital Converter According to various embodiments, systems, methods, and computer program products enable a novel scheme of high symbol-rate optical Nyquist signal generation with approaching zero roll-off factors. This novel scheme is based all-optical sine-shaped pulse generation and orthogonal time division multiplexing (OTDM) with digital Nyquist QAM signal modulation. The disclosed embodiments combine two technologies: digital and all-optical methods. The combination of these technologies enables high symbol rate optical Nyquist signal generation. This disclosure presents results of experimental investigations of a Nyquist wavelength division multiplexing (WDM) system that enables generation and detection of PDM 75 GBaund and 125-GBaud optical Nyquist signals with quasi-zero roll-off factors.

The disclosed embodiments overcome deficiencies with conventional systems, as described below. High SE and high data-rate systems have been developed with the aim of increasing transmission capacity and efficiency. Orthogonal multiplexing technologies, including orthogonal frequency division multiplexing (OFDM) and Nyquist pulse multiplexing provide solutions to encode digital data in reduced bandwidth with and increased SE. Compared with OFDM, however, Nyquist signal transmission has several unique advantages such as lower receiver bandwidth and lower peak-to-average power ratio. High symbol rate Nyquist signal generation is difficult, however, especially for signals with quasi-zero roll-off factors.

Electrical Nyquist signals can be generated with roll-off factors approaching zero using long digital taps. The generation of such signals, however, is restricted by speeds of electronic systems. Alternatively, all optical methods may provide a promising approach for generation of high symbol-rate Nyquist signals. High symbol-rate optical Nyquist signals can be generated by modulating and OTDM'ing a Nyquist pulse train. Such a Nyquist pulse train may comprise period sine-shaped pulses (PSSP).

Disclosed embodiments relate to a Nyquist wavelength division multiplexing (WDM) system that enables generation and detection of PDM 75 GBaund and 125-GBaud optical Nyquist signals with quasi-zero roll-off factors. Disclosed embodiments demostrate the feasibility of 125-GBaud all-optical Nyquist QPSK signal generation and polarization-multiplexed all-optical Nyquist signal transmission with roll-off factors approaching zero.

The disclosed embodiments are superior to conventional systems and techniques. Conventional systems have failed to generate all optical Nyquist signals having roll-off factors less than 0.2. Such large roll-off factors tend to cause larger inter-channel-interferences (ICI) in the Nyquist-WDM systems. In such conventional systems, the theoretical ideal rectangular frequency spectra for sine-shaped pules is degraded when such pulses are modulated with digital data. In such systems, theoretically, zero roll-off can only be achieved when the number of the comb tones is infinity. The disclosed embodiments overcome deficiences of conventional systems by combining two technologies: digital and all-optical methods. The combination of these technologies enables high symbol rate optical Nyquist signal generation, as described in further detail below.

Figure 1:
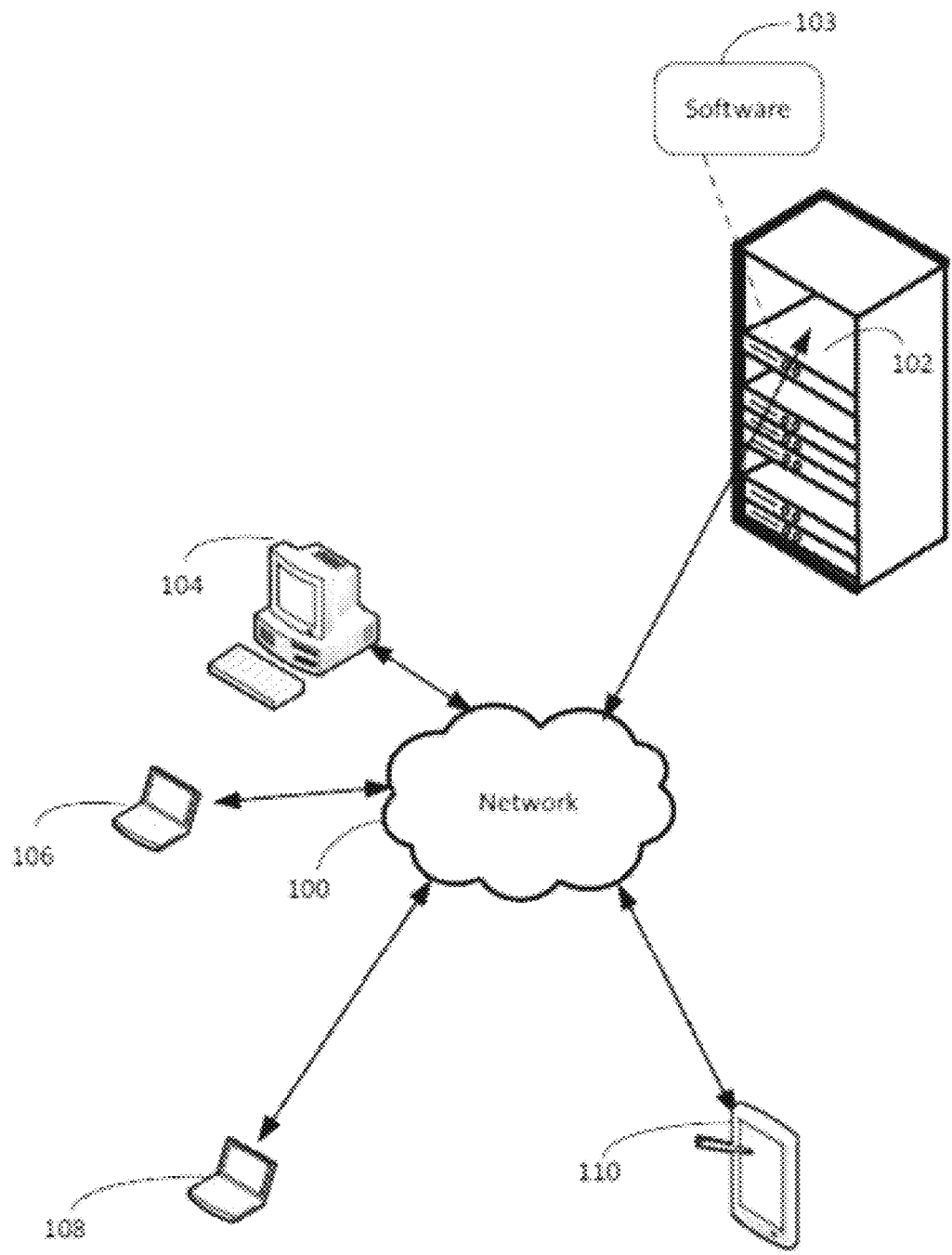
FIG. 1 is a block diagram of an example networking environment according to an embodiment of the disclosure.

Various embodiments of the disclosure may be implemented in a computer networking environment. FIG. 1 is a block diagram of an example networking environment, according to an embodiment. A computer network 100 ("network 100") provides data connectivity to and among multiple computing devices. Possible implementations of the network 100 include a local-area network, a wide-area network, a private network, a public network (e.g., the Internet), or any combination of these. The network 100 may include both wired and wireless components. A first computing device 102 ("computing device 102"), a second computing device 104 ("computing device 104"), a third computing device 106 ("computing device 106"), a fourth computing device 108 ("computing device 108"), and a fifth computing device 110 ("computing device 110") are each communicatively linked to the network 102.

The computing device 102 executes software 103 (e.g., a set of computer-readable instructions stored in a non-transitory computer-readable medium (e.g., memory)). The computing device 102 is depicted as a rack-mounted server, the second computing device 104 is depicted as a desktop computer, the computing devices 106 and 108 are depicted as notebook computers, and the computing device 110 is depicted as a tablet computer. However, the computing devices depicted in FIG. 1 are merely representative. Other possible implementations of a computing device include a smartphone.

In an embodiment, under the control of the software 103, the first computing device 102 interacts with one or more of the computing devices 104, 106, 108, and 110 to migrate a network segment from one technology or administrative domain to another technology or administrative domain.

Figure 2:
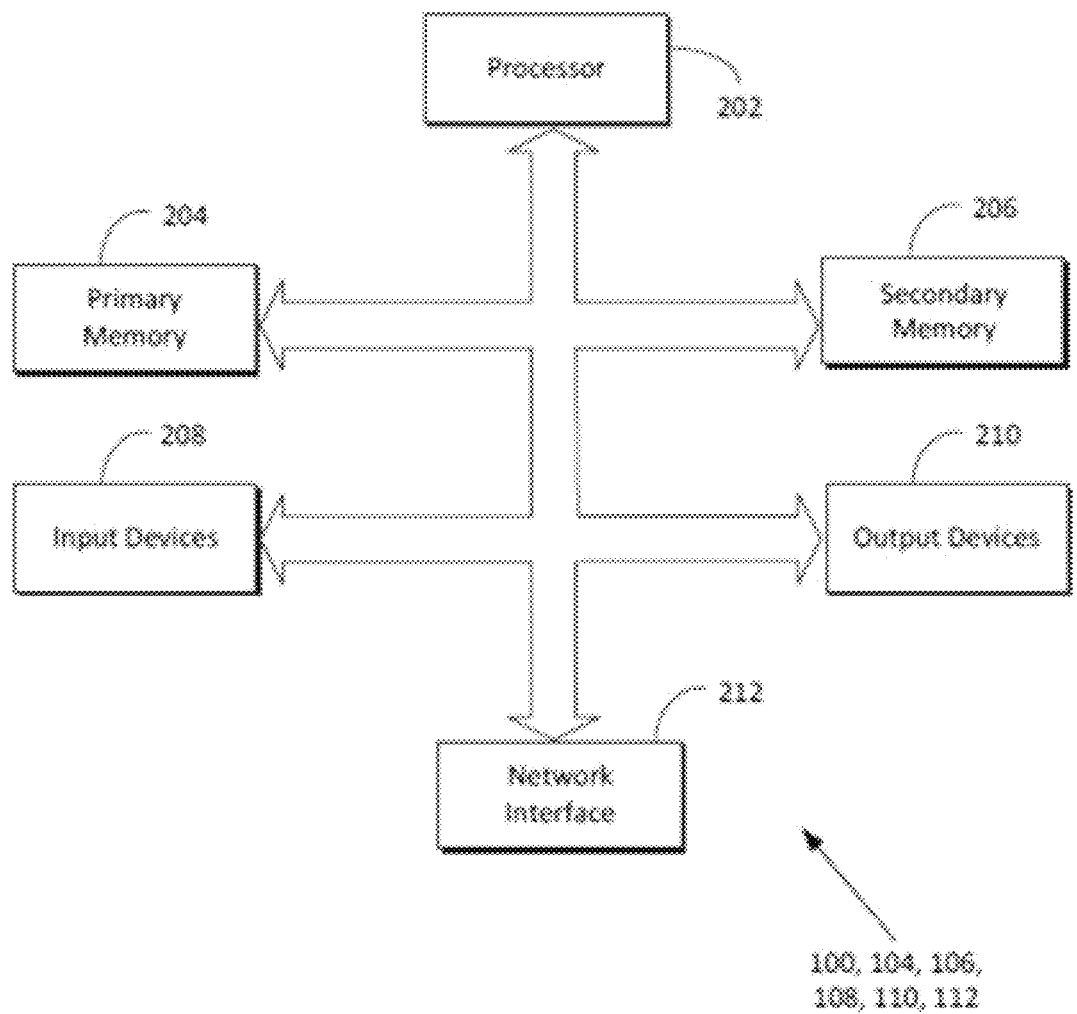
FIG. 2 is a block diagram of a computing device according to an embodiment.

In an embodiment, one or more of the computing devices of FIG. 1 (and any other computing device discussed herein) may have the general architecture shown in FIG. 2. The device depicted in FIG. 2 includes a hardware processor 202 ("processor 202") (e.g., a microprocessor, a microcontroller, a set of peripheral integrated circuit elements, an integrated circuit (e.g., an application-specific integrated circuit), hardware/electronic logic circuits (e.g., a discrete element circuit), a programmable logic device (e.g., a programmable logic array), or a field programmable gate-array), a primary memory 204 (e.g., volatile memory, random-access memory), a secondary memory 206 (e.g., non-volatile memory), input devices 208 (e.g., user input devices such as a keyboard, mouse, or touchscreen), output devices 210 (e.g., a display, such as an organic, light-emitting diode display), and a network interface 212 (which may be wired or wireless). The memories 204 and 206 store instructions and data. The processor 202 executes the instructions and uses the data to carry out various procedures including, in some embodiments, the methods described herein.

Possible implementations of either or both the primary memory 204 and the secondary memory 206 include volatile memory, non-volatile memory, electrical, magnetic optical memory, random access memory ("RAM"), cache, and hard disc.

FIG. 3A is a schematic illustration of a high symbol rate Nyquist signal generation system with roll-off factor approaching zero, according to an embodiment. This system utilizes all-optical sinc-shaped pulse generation and OTDM with digital Nyquist QAM signal modulation. According to an embodiment, the system combines digital and all-optical methods, for high symbol rate optical Nyquist signal generation. In contrast to conventional rectangular-waveform driving signals, in the disclosed embodiments, the system modulated period optical sinc-shaped pulses with digital Nyquist pulse shaped signals. The digital Nyquist pulse shaped signals are generated by a low-speed digital-to-analog convertor (DAC) as shown in inset (i) of FIG. 3A, which are then optically multiplexed by a multiplexer.

FIG. 3B illustrates the frequency spectrum and theoretical roll-off factor after modulation of sine-shaped pulses, according to an embodiment. The spectrum of the modulated sinc-shaped pulses is given by a convolution of the frequency comb and the frequency representation of the modulating signal as shown in FIG. 3B as inset (ii). The broadened bandwidth can be reduced by simply reducing the RC roll-off factor for low-speed digital signal generation. FIG. 3B (inset (iii)) shows the theoretical roll-off factor after modulation for two kinds of driving signals (i.e. conventional rectangular vs. sinc-shaped pulses modulated with digital Nyquist pulse shaped signals) as a function of the number of tones in the frequency.

According to conventional systems, based on rectangular waveforms, the only way to reduce the real roll-off factor is to increase the number of tones. Systems according to the disclosed embodiments, however, provide another way for reducing the roll-off factor. This may be achieved by using driving signals having digital Nyquist shapes.

FIG. 4A illustrates simulation results characterizing the performance of 75-GBaud optical Nyquist signal generation in a Nyquist-WDM system, according to an embodiment, and FIG. 4B illustrates simulation results characterizing the performance of 125-GBaud optical Nyquist signal generation in the Nyquist-WDM system, according to a further embodiment. The simulation results of FIGS. 4A and 4B illustrate the system performance with respect to different signal waveforms and different roll-off factors.

As shown in FIGS. 4A and 4B, when using 75-GBaud and 125-GBaud QPSK modulated pulses, roughly a 1.6-dB and 1.25-dB improvement of the Q2 value, respectively, is obtained with digital Nyquist-shaped signals having zero roll-off factor, in comparison with results obtained using conventional rectangular waveform signals.

FIG. 4C presents simulation results of a study of the effect of between the pulse peak and eye-opening points on signal performances, according to an embodiment. FIG. 4C shows that the performance of the generated optical Nyquist signals gets worse when the time-offset is increased. In practice, therefore, the clocks of the driving signals and RF signals should be synchronized at the Tx side.

FIG. 5A is a schematic illustration of a system that enables high symbol rate PDM optical Nyquist signal generation and Nyquist-WDM transmission, according to an embodiment. This system enables generation and transmission of Nyquist signals with roll-off factor approaching zero. According to an embodiment, an optical PSSP source is realized by a cascaded MZM driven by RF signals. In this example, clock1 is driven at 12.5 GHz with a frequency doubler for frequency comb generation with 25-GHz carrier spacing. Different combs may be generated by using a polarization-maintaining tunable-optical filter with a tunable bandwidth. A 25-GBaud digital Nyquist-shaped driving signal is generated by a commercial DAC driven at 64 GSa/s. For digital Nyquist shaping, the taps number is 65 in this example.

In this example, the I/Q modulator is based on the use of $LiNbO_3$ waveguides with a modulation bandwidth of 27-GHz. One electronic phase shifter (PS) is used between the DAC clock signal (clock2) and the RF source (clock1) for comb generation, which synchronizes the modulation I/Q signals and the Nyquist pulses. Each branch is individually delayed for decorrelation. Test results for the Nyquist-WDM system were generated by inserting 75 and 125-GBaud optical Nyquist signals into the 75 and 125-GHz slot, and detected together with 8 loading channels. The setup of these loadings is shown in FIG. 5B, where 25-GBaud QPSK signal is modulated.

FIG. 5C is a schematic illustration of a coherent receiver, according to an embodiment. In this example, the coherent receiver includes a free-running ECL with linewidth less than 100 kHz that is utilized as LO. In this example, a polarization-diversity 90° optical hybrid and four balanced photo-detectors (PDs) with 50 GHz 3-dB bandwidth are used for coherent detection. At the receiver, the digital ADCs were operated at 160 GSa/s with 65 GHz bandwidth as a real-time sampling oscilloscope. After the ADC, the off-line digital signal processing was then applied for a four channel sampled data sequence. The data is first resampled to 2 samples per symbol with time recovery, and then processed by the modified QPSK digital signal processing. In general, the phases between the symbols in each tributary are unknown. Therefore, in this example, time partitioning is performed after the polarization demultiplexing but before carrier recovery. The FOE and phase recovery are applied for each TDM tributaries.

FIG. 5D illustrates the spectrum of generated 25-GHz spaced comb before PM-TOF, according to an embodiment. In this example, after PM-TOF, the 3- and 5-tone frequency combs with 25-GHz spacing and equal power are shown in FIGS. 5E and 5F, respectively. The time-domain waveforms of the 3 and 5-tone combs are shown in FIGS. 5G and 5H as PSSP. These results show that, in this example, the repeating period of the combs is 40 ps. However, the PSSP has four zero-crossing points between each pulse, and the pulse durations between two zero-crossing points in FIGS. 5H and 5G are 26.66 and 16 ps, respectively.

FIGS. 6A and 6B show the spectra of the 75 and 125-GBaud optical Nyquist signals generated using rectangular driving signals. FIGS. 6C and 6D present the spectra of 75 and 125-GBaud optical Nyquist signals generated using digital Nyquist-shaped driving signals with zero-roll-off factor. In this example, the roll-off factor after modulation can approach zero.

FIGS. 6E and 6F show the back-to-back BER performances of the 75-GBaud and 125-GBaud optical Nyquist PDM-QPSK signals, respectively, that were generated using different driving waveforms in both SC and Nyquist-WDM cases. Compared with the SC cases, the penalties for 75-GBaud and 125-GBaud optical Nyquist signals in Nyquist-WDM cases generated using rectangular waveform driving signals are greater than 2.5-dB and 1.5-dB, respectively. However, when using optical Nyquist signals, the penalties are both less than 0.5-dB for the 75-GBaud and 125-GBaud signals. Therefore, the disclosed embodiments enable significant improvement by reducing the ICI penalties caused by excess-bandwidth after modulation.

For the purposes of promoting an understanding of the principles of the disclosure, reference has been made to the embodiments illustrated in the drawings, and specific language has been used to describe these embodiments. However, no limitation of the scope of the disclosure is intended by this specific language, and the disclosure should be construed to encompass all embodiments that would normally occur to one of ordinary skill in the art. The terminology used herein is for the purpose of describing the particular embodiments and is not intended to be limiting of exemplary embodiments.

A "computing device" as described herein may comprise a processor, a memory for storing program data to be executed by the processor, a permanent storage such as a disk drive, a communications port for handling communications with external devices, and user interface devices, including a display, touch panel, keys, buttons, etc. When software modules are involved, these software modules may be stored as program instructions or computer readable code executable by the processor on a non-transitory computer-readable media such as magnetic storage media (e.g., magnetic tapes, hard disks, floppy disks), optical recording media (e.g., CD-ROMs, Digital Versatile Discs (DVDs), etc.), and solid state memory (e.g., random-access memory (RAM), read-only memory (ROM), static random-access memory (SRAM), electrically erasable programmable read-only memory (EEPROM), flash memory, thumb drives, etc.). The computer readable recording media may also be distributed over network coupled computer systems so that the computer readable code is stored and executed in a distributed fashion. This computer readable recording media may be read by the computer, stored in the memory, and executed by the processor.

The various embodiments may be described herein in terms of functional block components and various processing steps. Such functional blocks may be realized by any number of hardware and/or software components configured to perform the specified functions. For example, the embodiments described herein may employ various integrated circuit components, e.g., memory elements, processing elements, logic elements, look-up tables, and the like, which may carry out a variety of functions under the control of one or more microprocessors or other control devices. Similarly, where the elements are implemented using software programming or software elements, one or more embodiments may be implemented with any programming or scripting language such as C, C++, JAVA®, assembler, or the like, with the various algorithms being implemented with any combination of data structures, objects, processes, routines or other programming elements. Functional aspects may be implemented in algorithms that execute on one or more processors. Furthermore, various embodiments may employ any number of conventional techniques for electronics configuration, signal processing and/or control, data processing and the like. Finally, the steps of all methods described herein may be performed in any suitable order unless otherwise indicated herein or otherwise clearly contradicted by context.

For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Words such as "mechanism," "element," "unit," "structure," "means," and "construction" are used broadly and are not limited to mechanical or physical embodiments, but may include software routines in conjunction with processors, etc.

The use of any and all examples, or exemplary language (e.g., "such as") provided herein, is intended merely to better illuminate the disclosure and does not pose a limitation on the scope of the disclosure unless otherwise claimed. Numerous modifications and adaptations will be readily apparent to those of ordinary skill in this art without departing from the spirit and scope of the disclosure.

No item or component is essential to the practice of the various embodiments. It will also be recognized that the terms "comprises," "comprising," "includes," "including," "has," and "having," as used herein, are specifically intended to be read as open-ended terms of art. The use of the terms "a" and "an" and "the" and similar referents are to be construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

We claim:

1. A method for data transmission using optical signals that exhibit high data-rate and high spectral-efficiency transmission, the method comprising:
   generating an optical sinc-shaped pulse for each of a plurality of frequency tones;
   modulating the sinc-shaped pulses using digital Nyquist modulation signals to encode data into corresponding modulated sinc-shaped pulses;
   synchronizing the sinc-shaped pulses and the Nyquist modulation signals;
   optically multiplexing the modulated sinc-shaped pulses; and
   transmitting the data via the optically multiplexed modulated sinc-shaped pulses.

2. The method according to claim 1, wherein the modulating is performed by modulating the sinc-shaped pulses using 25-GBaud, 75-GBaud, or 125-GBaud digital Nyquist-shaped driving signals having zero roll-off factor.

3. The method according to claim 1, wherein the modulating is performed using quadrature amplitude modulation.

4. The method according to claim 1, wherein the multiplexing is performed using orthogonal time-division multiplexing.

5. A system for data transmission using optical signals that exhibit high data-rate and high spectral-efficiency transmission, the system comprising:
- an optical pulse generator that generates an optical sinc-shaped pulse for each of a plurality of frequency tones;
- a modulator that modulates the sine-shaped pulses using digital Nyquist modulation signals to encode data into the modulated sine-shaped pulses;
- a multiplexer that optically multiplexes the modulated sinc-shaped pulses;
- an electronic phase shifter that synchronizes the sine-shaped pulses and the Nyquist modulation signals; and
- a transmitter that transmits the data via the optically multiplexed modulated sine-shaped pulses.

6. The system according to claim 5, wherein the modulator modulates the sine-shaped pulses using 25-GBaud, 75-GBaud, or 125-GBaud digital Nyquist-shaped driving signals having zero roll-off factor.

7. The system according to claim 5, wherein the modulator modulates the sinc-shaped pulses using quadrature amplitude modulation.

8. The system according to claim 5, wherein the multiplexer performs orthogonal time-division multiplexing on the modulated sinc-shaped pulses.

9. A non-transitory computer storage device that contains computer program instructions stored thereon that, when executed by a processor, causes the processor to control a system to perform a method comprising:
- generating an optical sinc-shaped pulse for each of a plurality of frequency tones;
- modulating the sinc-shaped pulses using digital Nyquist modulation signals to encode data into corresponding modulated sinc-shaped pulses;
- synchronizing the sinc-shaped pulses and the Nyquist modulation signals;
- optically multiplexing the modulated sinc-shaped pulses; and
- transmitting the data the via the optically multiplexed modulated sinc-shaped pulses.

10. The non-transitory computer storage device of claim 9, wherein the modulating is performed by modulating the sinc-shaped pulses using 25-GBaud, 75-GBaud, or 125-GBaud digital Nyquist-shaped driving signals having zero roll-off factor.

11. The non-transitory computer storage device of claim 9, wherein the modulating is performed using quadrature amplitude modulation.

12. The non-transitory computer storage device of claim 9, wherein optically multiplexing the modulated sinc-shaped pulses comprises orthogonal time-division multiplexing.

13. A method for generating a high symbol-rate optical Nyquist signal approaching zero roll-off factor, the method comprising:
- generating one or more optical sinc-shaped pulses; and
- modulating the period of the one or more optical sinc-shaped pulses using one or more digital Nyquist pulse shaped signals;
- synchronizing the sinc-shaped pulses and the Nyquist modulation signals; and
- optically multiplexing the modulated sinc-shaped pulses.

14. The method of claim 13, further comprising using the high symbol-rate Nyquist system in a Nyquist-WDM system.

15. The method of claim 13, wherein modulating the period of the one or more optical sinc-shaped pulses using one or more digital Nyquist pulse shaped signals comprises modulating the period with digital Nyquist QAM signal modulation.

16. The method of claim 13, wherein the one or more optical sinc-shaped pulses are generated using cascaded MZM driven by the RF signals.

* * * * *